United States Patent
Kobayashi et al.

(10) Patent No.: US 9,746,076 B2
(45) Date of Patent: Aug. 29, 2017

(54) SPEED DATA DISPLAY SYSTEM FOR A WORK VEHICLE

(71) Applicant: KUBOTA CORPORATION, Osaka (JP)

(72) Inventors: Takashi Kobayashi, Osaka (JP); Shinnosuke Ishikawa, Osaka (JP); Yoshihiro Kushita, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 233 days.

(21) Appl. No.: 14/810,993

(22) Filed: Jul. 28, 2015

(65) Prior Publication Data

US 2016/0033038 A1    Feb. 4, 2016

(30) Foreign Application Priority Data

Aug. 1, 2014  (JP) ................. 2014-157701

(51) Int. Cl.
*F16H 63/42* (2006.01)
*B60K 35/00* (2006.01)
(Continued)

(52) U.S. Cl.
CPC ............. *F16H 63/42* (2013.01); *B60K 35/00* (2013.01); *B60K 37/06* (2013.01); *F16H 59/02* (2013.01);
(Continued)

(58) Field of Classification Search
None
See application file for complete search history.

(56) References Cited

U.S. PATENT DOCUMENTS 5,249,833 A * 10/1993 Kobayashi ............. G09F 21/04
                                                        296/21
5,706,197 A    1/1998 Stasik
(Continued)

FOREIGN PATENT DOCUMENTS

JP       60-22532     2/1985
JP        8-61479     3/1996
(Continued)

OTHER PUBLICATIONS

Office Action and SR (with English translations) issued in JP 2014-157701 dated Jun. 19, 2017 (22 pages).

*Primary Examiner* — Edwin A Young
(74) *Attorney, Agent, or Firm* — Greenblum & Bernstein, P.L.C.

(57) ABSTRACT

A speed change display control device includes a display screen generator generating a first display screen and a second display screen. The first display screen includes: an auxiliary speed change stage display area displaying auxiliary speed change stages; a main speed change stage display area displaying main speed change stages assigned to the auxiliary speed change stages; and an engaged speed change stage display area displaying engaged speed change stages. The second display screen includes: the auxiliary speed change stage display area; the main speed change stage display area; a lower limit selection area where the speed change stage defining a lower limit of a vehicle speed change ratio is selected; an upper limit selection area where the speed change stage defining an upper limit of the vehicle speed change ratio is selected; and a selected speed change stage display area displaying the currently selected upper limit and lower limit speed change stages.

15 Claims, 10 Drawing Sheets

(51) Int. Cl.
*B60K 37/06* (2006.01)
*F16H 59/02* (2006.01)
(52) U.S. Cl.
CPC ..... *B60Y 2200/221* (2013.01); *B60Y 2300/19* (2013.01); *F16H 2063/426* (2013.01)

(56) References Cited

U.S. PATENT DOCUMENTS

2004/0201465 A1* 10/2004 Meyer ..................... F16H 63/42
340/438
2008/0141927 A1* 6/2008 Takeshige .............. B60K 37/02
116/62.4

FOREIGN PATENT DOCUMENTS

| JP | 2001-132837 | 5/2001 |
| JP | 2008-57674 | 3/2008 |
| JP | 2009-214877 | 9/2009 |
| JP | 2012-132529 | 7/2012 |

* cited by examiner

Fig. 9

| | | Main speed change operation | | | | Auxiliary speed change operation | |
|---|---|---|---|---|---|---|---|
| | | Road travel | | Work travel | | | |
| Speed change stage before operation | | Speed change stage after operation | | Speed change stage after operation | | Speed change stage after operation | |
| Aux. | Main | UP | DN | UP | DN | UP | DN |
| A | 1 | A-2 | | A-2 | | B-1 | |
| | 2 | A-3 | A-1 | A-3 | A-1 | B-1 | |
| | 3 | A-4 | A-2 | A-4 | A-2 | B-1 | |
| | 4 | B-1 | A-3 | | A-3 | B-1 | |
| B | 1 | B-2 | A-4 | B-2 | | C-1 | A-4 |
| | 2 | B-3 | B-1 | B-3 | B-1 | C-1 | A-4 |
| | 3 | B-4 | B-2 | B-4 | B-2 | C-1 | A-4 |
| | 4 | C-2 | B-3 | | B-3 | C-2 | A-4 |
| C | 1 | C-2 | B-3 | C-2 | | D-1 | B-3 |
| | 2 | C-3 | C-1 | C-3 | C-1 | D-1 | B-4 |
| | 3 | C-4 | C-2 | C-4 | C-2 | D-1 | B-4 |
| | 4 | D-2 | C-3 | | C-3 | D-2 | B-4 |
| D | 1 | D-2 | C-3 | D-2 | | E-1 | C-3 |
| | 2 | D-3 | D-1 | D-3 | D-1 | E-1 | C-4 |
| | 3 | D-4 | D-2 | D-4 | D-2 | E-1 | C-4 |
| | 4 | E-3(E-2) | D-3 | | D-3 | E-3(E-2) | C-4 |
| E | 1 | E-2 | D-2(D-3) | E-2 | | F-1 | D-2(D-3) |
| | 2 | E-3 | E-1 | E-3 | E-1 | F-1 | D-3(D-4) |
| | 3 | E-4 | E-2 | E-4 | E-2 | F-1 | D-4 |
| | 4 | F-1 | E-3 | | E-3 | F-2 | D-4 |
| F | 1 | F-2 | E-4 | F-2 | | | E-3 |
| | 2 | F-3 | F-1 | F-3 | F-1 | | E-4 |
| | 3 | F-4 | F-2 | F-4 | F-2 | | E-4 |
| | 4 | | F-3 | | F-3 | | E-4 |

SPEED DATA DISPLAY SYSTEM FOR A WORK VEHICLE

CROSS-REFERENCE TO RELATED APPLICATIONS

The present application claims priority under 35 U.S.C. §119 of Japanese Application No. 2014-157701, filed on Aug. 1, 2014, the disclosure of which is expressly incorporated by reference herein in its entirety.

BACKGROUND OF THE INVENTION

1. Field of the Invention

The present invention relates to a speed change display control device for a traveling work vehicle that includes: a main speed change device switching between speed change stages without interrupting transmission of drive power; an auxiliary speed change device switches between speed change stages accompanied by an interruption in the transmission of drive power; and a speed change controller outputting a speed change control command to the main speed change device and the auxiliary speed change device and creating a vehicle speed change ratio with combinations of main speed change stages of the main speed change device and auxiliary speed change stages of the auxiliary speed change device.

2. Description of Related Art

In order to achieve various speeds (vehicle speeds) appropriate to work travel and road travel in a traveling work vehicle such as a tractor, a speed change controller is commonly used which combines a main speed change device and an auxiliary speed change device to create a vehicle speed change ratio of twenty or more speeds.

For example, Japanese Patent Laid-open Publication No. 2008-57674 discloses a work vehicle that includes a main speed change device having eight speed change stages and an auxiliary speed change device having three speed change stages. The speed change stage of the main speed change device is determined by a main speed change lever, which can be operated to speed change positions for speed 1 to speed 8. The speed change stage of the auxiliary speed change device is determined by an auxiliary speed change lever, which can be operated to three speed change positions. The operation positions of the main speed change lever are displayed on a display having seven segments. Therefore, a driver can set a desired speed change stage from among the eight speed change stages while looking at the display.

An agricultural tractor disclosed by Japanese Patent Laid-open Publication No. 2009-214877 includes a main speed change device, which achieves eight speed change stages through combination of a four-stage first main speed change device and a two-stage second main speed change device; and an auxiliary speed change device, which is capable of three speed change stages. Because a main clutch switching operation is required when operating the auxiliary speed change device, a main clutch pedal is depressed and an operation lever is operated in a front/back direction or a left/right direction, and the main clutch pedal is released after the speed change operation. In addition, with respect to the main speed change device, speed is changed by pressing down an acceleration switch and a deceleration switch provided to a knob on the operation lever. Specifically, by pressing an acceleration switch 37 in order from speed 1, the speed is changed one stage at a time, up to speed 8. When the main speed change device is instead in the speed 8 position, by pressing the deceleration switch in order, the speed can be reduced from speed 8 to speed 1. A display of the selected speed change stage is given via a liquid crystal display provided to an instrument panel. The speed change position of the auxiliary speed change device is displayed in a top left area of the liquid crystal display, and the speed change position of the main speed change device is displayed in reverse on a right side of the liquid crystal display.

In traveling work vehicles such as those described above, a plurality of speed change stages are obtained through the combination of a main speed change device and an auxiliary speed change device. However, employing the correct speed change stages in a simple manner in order to achieve smooth work travel has not yet been achieved. In view of this, the present invention provides a speed change display control device capable of correctly employing a plurality of speed change stages obtained by combining a main speed change device and an auxiliary speed change device.

SUMMARY OF THE INVENTION

One aspect of the present invention is a speed change display control device for a traveling work vehicle that includes: a main speed change device switching between speed change stages without interrupting transmission of drive power; an auxiliary speed change device switching between speed change stages accompanied by an interruption in the transmission of drive power; and a speed change controller outputting a speed change control command to the main speed change device and the auxiliary speed change device and creating a vehicle speed change ratio with combinations of main speed change stages of the main speed change device and auxiliary speed change stages of the auxiliary speed change device. The speed change display control device includes a display screen generator generating a first display screen and a second display screen. The first display screen includes an auxiliary speed change stage display area displaying a grouping of the auxiliary speed change stages; a main speed change stage display area displaying a grouping of the main speed change stages assigned to the auxiliary speed change stages; and an engaged speed change stage display area displaying the engaged speed change stages, which are obtained through the combination of the main speed change stage currently in use and the auxiliary speed change stage currently in use. The second display screen includes the auxiliary speed change stage display area; the main speed change stage display area; a lower limit selection area where the speed change stage defining a lower limit of the vehicle speed change ratio is selected; an upper limit selection area where the speed change stage defining an upper limit of the vehicle speed change ratio is selected; and a selected speed change stage display area displaying the currently selected upper limit and lower limit speed change stages.

According to this configuration, the first display screen, which a driver focuses on while traveling, is provided with the auxiliary speed change stage display area displaying the grouping of auxiliary speed change stages and the main speed change stage display area displaying the grouping of main speed change stages assigned to the auxiliary speed change stages, and is further provided with the engaged speed change stage display area displaying the main speed change stage currently in use and the auxiliary speed change stage currently in use. Accordingly, the driver can easily view the speed change stage currently in use while looking at the plurality of main speed change stages and the plurality of auxiliary speed change stages. Thus, the driver can readily recognize how far the position occupied by the speed change stage currently in use is from the minimum speed stage and the maximum speed stage, and can understand the appropriate speed change stage to select next. Moreover, in the speed change device to which the present invention is applied, a speed change range that can be achieved by the speed change operation can be selected from a group of a plurality of speed change stages (vehicle speed change ratio) obtained by combining the main speed change stages of the main speed change device and the auxiliary speed change stages of the auxiliary speed change device, and that selection can be made via the second display screen. In other words, the speed change stage defining the lower limit of the vehicle speed change ratio can be selected in the lower limit selection area, and the speed change stage defining the upper limit of the vehicle speed change ratio can be selected in the upper limit selection area. The auxiliary speed change stage display area and the main speed change stage display area of the second display screen are shared with the first display screen; therefore, the driver can readily become familiar with the display.

In another aspect of the present invention, the auxiliary speed change stage display area and the main speed change stage display area each have a semicircular bar graph shape. Accordingly, the auxiliary speed change stage display area and the main speed change stage display area do not spread laterally and are displayed with focus placed on a single point; therefore, the auxiliary speed change stage and the main speed change stage can be identified at a glance.

In another aspect of the present invention, the lower limit selection area and the upper limit selection area each have a semicircular bar graph shape coaxial with the semicircles formed by the auxiliary speed change stage display area and the main speed change stage display area. With this configuration, the auxiliary speed change stage display area and the main speed change stage display area are displayed with focus placed on a shared single point; therefore, the driver can identify both the auxiliary speed change stage and the main speed change stage at a glance. When the number of main speed change stages is less than the number of auxiliary speed change stages, by positioning the main speed change stage display area on a diameter-direction exterior of the auxiliary speed change stage display area and positioning the upper limit selection area on the diameter-direction exterior of the lower limit selection area, the space required can be minimized even when all of the main speed change stages are provided above each of the auxiliary speed change stages.

In another aspect of the present invention, a lower limit setting indicator indicating the lower limit speed change stage is arranged in the lower limit selection area so as to be capable of moving within the lower limit selection area, and an upper limit setting indicator indicating the upper limit speed change stage is arranged in the upper limit selection area so as to be capable of moving within the upper limit selection area. By employing such a display layout, visual comprehension is facilitated in a task of selecting the lower limit speed change stage and the upper limit speed change stage.

Moreover, when the engaged speed change stage display area and the selected speed change stage display area share a display area, a selection range of the speed change stages can be identified much as the speed change stage during travel is identified, facilitating familiarization with a task of selecting the speed change stage.

In another aspect of the present invention, the display screen generator further generates a third display screen, the third display screen being an engaged speed change stage selection screen on which a speed change stage to be used is selected from the grouping of main speed change stages. By employing such a configuration, the task of selecting the speed change stages that can actually be used from the grouping of main speed change stages can also be performed via a display provided by the first and second display screens.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 9 is a speed change stage switching table illustrating speed change stages of a main speed change device and an auxiliary speed change device after a speed change operation.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
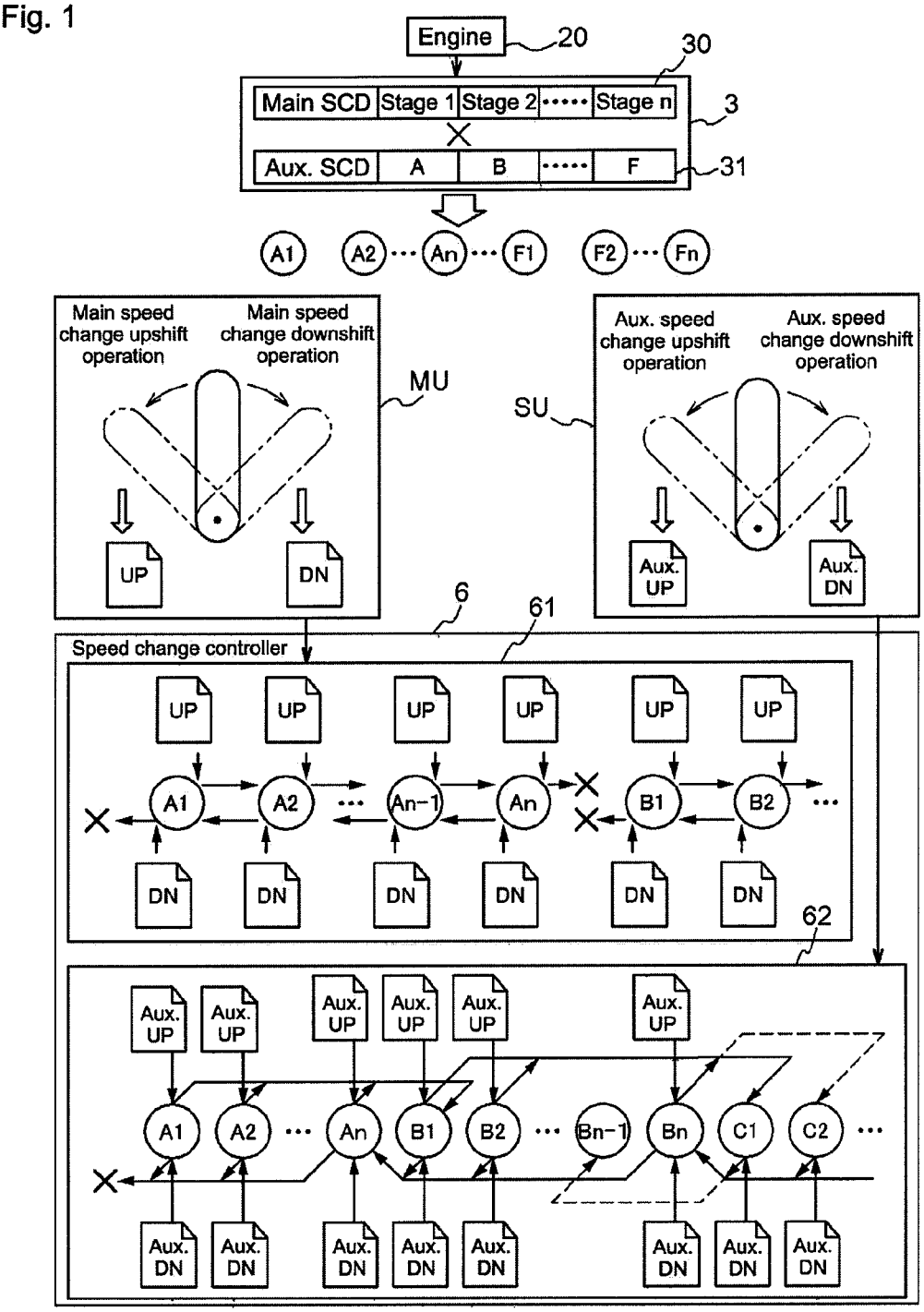
FIG. 1 is a schematic view illustrating basic principles of speed change controls or system according to the present invention.

Before describing specific embodiments of a traveling work vehicle according to the present invention, basic principles of speed change controls according to the present invention are described with reference to FIG. 1. The traveling work vehicle according to the present invention includes a transmission 3 changing a speed of drive power from an engine 20 and transmitting the drive power to drive wheels. The transmission 3 includes a main speed change device 30 and an auxiliary speed change device 31. The main speed change device 30 is of a type that switches between speed change stages without interrupting the transmission of drive power, whereas the auxiliary speed change device 31 is of a type that switches between speed change stages accompanied by an interruption in the transmission of drive power. Hereafter, controls switching between speed change stages in the main speed change device 30 and the auxiliary speed change device 31, i.e., so-called fundamentals of speed change control, are described with reference to FIG. 1. In the present example, the main speed change device 30 includes 1 to "n" speed change stages (where "n" is a natural or whole number, typically signifying a number between 4 and 8). The auxiliary speed change device 31 includes A to F speed change stages (reference symbols A to F are used to differentiate variable stages and do not signify the number of variable stages; typically, there are between 2 and 8 variable stages). A single vehicle speed change ratio is created through combination of the selected speed change stage of the main speed change device 30 and the selected speed change stage of the auxiliary speed change device 31. In FIG. 1, a combination speed change stage of this kind is depicted by a combination of the numerical value (natural number) of the speed change stage of the main speed change device 30 and the reference symbol (alphabetic letter) of the speed change stage of the auxiliary speed change device 31.

A driver operates a first operation portion MU to switch the speed change stage of the main speed change device 30 and operates a second operation portion SU to switch the speed change stage of the auxiliary speed change device 31. The first operation portion MU and the second operation portion SU can be configured or activated by a lever, a button, a dial, or any combination of the above. Whatever the configuration, the first operation portion MU outputs an operation instruction to the main speed change device 30 for a speed change acceleration (upshift) or a speed change deceleration (downshift), and the second operation portion SU outputs an operation instruction to the auxiliary speed change device 31 for the speed change acceleration (upshift) or the speed change deceleration (downshift).

The operation instructions output from the first operation portion MU and the second operation portion SU are input to a speed change control portion 6. The speed change control portion 6 outputs a speed change control instruction to the main speed change device 30, the auxiliary speed change device 31, or to both the main speed change device 30 and the auxiliary speed change device 31, giving an instruction to create an appropriate vehicle speed change ratio based on the input operation instruction. In FIG. 1, for the purposes of description, a speed change stage switching function of the speed change control portion 6 is separated into a first travel controller 61, which generates a speed change control instruction exclusively switching the speed change stage of the main speed change device 30, and a second travel controller 62, which generates a speed change control instruction that also involves switching the speed change stage of the auxiliary speed change device 31.

The speed change control portion 6 includes a work travel mode employed when traveling while the traveling work vehicle performs work in a work field; and a road travel mode employed when the traveling work vehicle travels at a comparatively high speed on a road, such as a public road. The controls switching between speed change stages in the speed change control portion 6 can be defined so as to be different in the two travel modes. The controls switching between speed change stages in the work travel mode are shown in the schematic diagram of FIG. 1.

As can be understood from FIG. 1, when an upshift instruction is input from the first operation portion MU, the speed change stage of the main speed change device 30 is raised one stage and the speed change stage of the auxiliary speed change device 31 is maintained. When the speed change stage of the main speed change device 30 prior to such an operation is already the maximum speed stage (stage "n" in FIG. 1), the speed change stage of the main speed change device 30 and the speed change stage of the auxiliary speed change device 31 are maintained and the overall vehicle speed change ratio does not change. Specifically, an upshift changing the speed change stage of the auxiliary speed change device 31 is not performed in response to the upshift instruction from the first operation portion MU. Similarly, when a downshift instruction is input from the first operation portion MU, the speed change stage of the main speed change device 30 is lowered one stage and the speed change stage of the auxiliary speed change device 31 is maintained. When the speed change stage of the main speed change device 30 prior to such an operation is already the minimum speed stage (stage 1 in FIG. 1), the speed change stage of the main speed change device 30 and the speed change stage of the auxiliary speed change device 31 are maintained and the overall vehicle speed change ratio does not change. Specifically, a downshift changing the speed change stage of the auxiliary speed change device 31 is not performed in response to the downshift instruction from the first operation portion MU.

The second operation portion SU is used to switch the speed change stage of the auxiliary speed change device 31. When an upshift instruction is input from the second operation portion SU, the speed change stage of the auxiliary speed change device 31 is raised one stage and, in principle, the speed change stage of the main speed change device 30 is switched to the minimum speed stage. Specifically, one speed change stage higher in the auxiliary speed change device 31 and stage 1 in the main speed change device 30 are combined by the upshift instruction from the second operation portion SU. This avoids causing a significant change in the vehicle speed change ratio by upshifting the auxiliary speed change device 31. However, a speed change stage configuration is such that even when the auxiliary speed change device 31 is upshifted while the speed change stage of the main speed change device 30 is at the maximum speed stage, and one speed change stage higher in the auxiliary speed change device 31 and stage 1 in the main speed change device 30 are combined, only a slight speed change differential results. With such a configuration, in an exceptional case, one speed change stage higher in the auxiliary speed change device 31 may be combined with a speed change stage at least one stage higher than the minimum speed stage of the main speed change device 30 (stage 2 in FIG. 1) (shown in FIG. 1 by a dotted line moving from Bn to C2). In addition, when the speed change stage of the auxiliary speed change device 31 is already at the maximum speed stage, the upshift instruction is ignored.

Similarly, when a downshift instruction is input from the second operation portion SU, the speed change stage of the auxiliary speed change device 31 is lowered one stage and, in principle, the speed change stage of the main speed change device 30 is switched to the maximum speed stage. Specifically, one speed change stage lower in the auxiliary speed change device 31 and the maximum speed stage in the main speed change device 30 are combined by the downshift instruction from the second operation portion SU. This avoids causing a significant change in the vehicle speed change ratio by downshifting the auxiliary speed change device 31. However, a speed change stage configuration is such that even when the auxiliary speed change device 31 is downshifted while the speed change stage of the main speed change device 30 is at the minimum speed stage, and one speed change stage lower in the auxiliary speed change device 31 and the maximum speed stage in the main speed change device 30 are combined, only a slight speed change differential results. With such a configuration, in an exceptional case, one speed change stage lower in the auxiliary speed change device 31 is combined with a speed change stage at least one stage lower than the maximum speed stage of the main speed change device 30 (shown in FIG. 1 by a dotted line moving from C1 to Bn−1). In addition, when the speed change stage of the auxiliary speed change device 31 is already at the minimum speed stage, the downshift instruction is ignored.

During road travel, a travel load is light and the traveling work vehicle benefits from its own inertia; therefore, there is a low potential that a shock will occur due to a momentary interruption in transmission of drive power caused when switching the speed change stage of the auxiliary speed change device 31. Therefore, in the road travel mode defined during road travel, in an exceptional case, a configuration is also possible that involves switching the speed change stage of the auxiliary speed change device 31 in response to the speed change operation instruction from the first operation portion MU. Although not shown in FIG. 1, when the upshift instruction is output from the first operation portion MU while the main speed change device 30 is at the maximum stage, for example, the speed change stage of the auxiliary speed change device 31 switches to one speed change stage higher, and the main speed change device 30 also switches to the minimum speed stage (stage 1) or to a speed change stage at least one stage higher than the minimum speed stage. Similarly, when the downshift instruction is output from the first operation portion MU while the main speed change device 30 is at the maximum speed stage (stage n), the speed change stage of the auxiliary speed change device 31 switches to one speed change stage lower, and the main speed change device 30 also switches to the maximum speed stage (stage n) or to a speed change stage at least one stage lower than the maximum speed stage (stage n−1).

Figure 2:
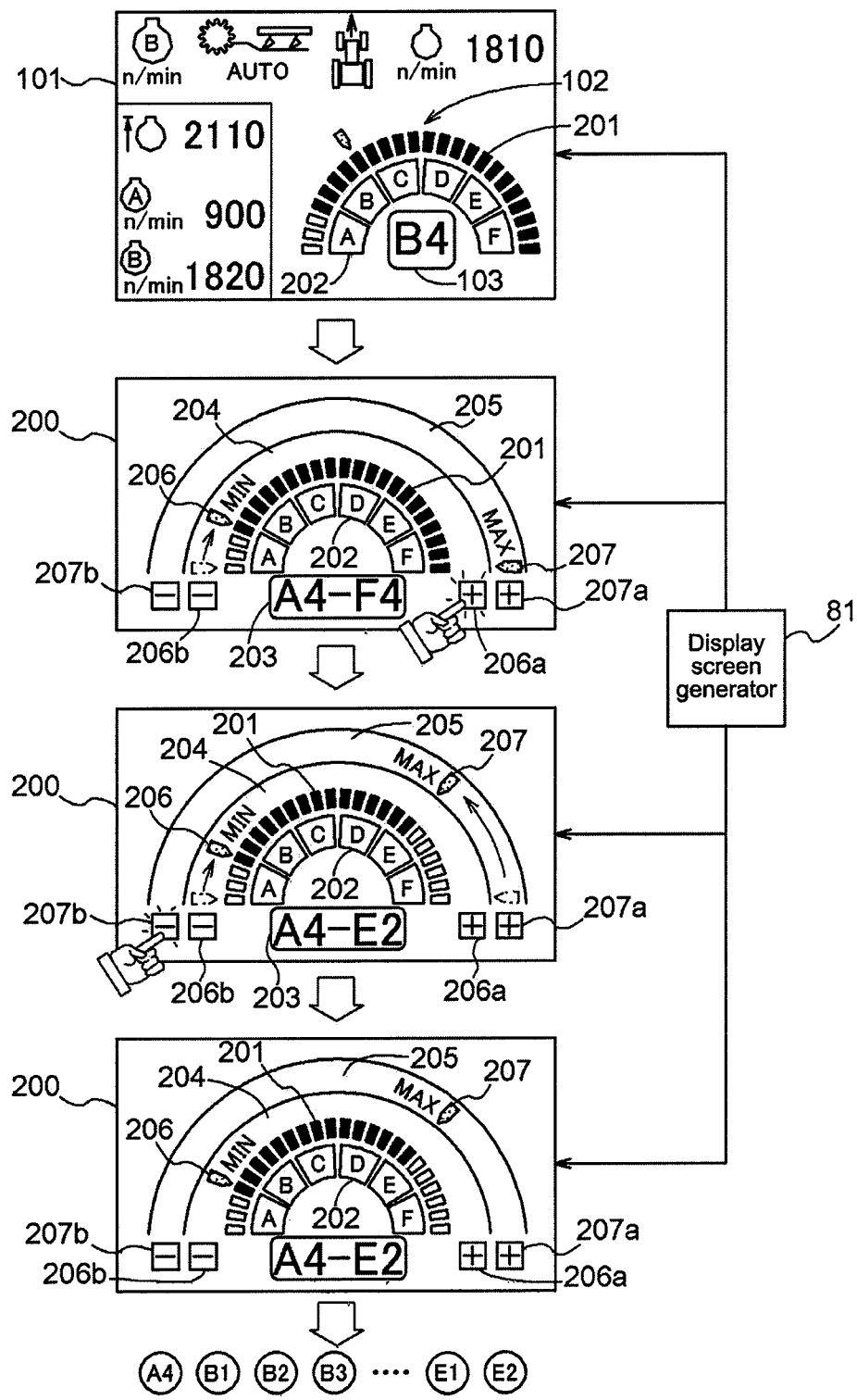
FIG. 2 is a schematic view illustrating an exemplary display screen for the speed change controls according to the present invention.

In a case where the speed change stages obtained by combining the main speed change device 30 and the auxiliary speed change device 31 exceed twenty, the speed change stages are almost never all used in normal work travel or road travel. Enabling only the speed change stages that are conceivably required for work travel or road travel to be performed soon thereafter is preferred. With reference to FIG. 2, a preferred embodiment is described in which only the speed change stages occupying a desired speed change range are selected from all of the speed change stages created by the combination of the main speed change device 30 and the auxiliary speed change device 31. In order to facilitate the description, in the present example, the main speed change device 30 includes four speed change stages numbered 1 to 4, and the auxiliary speed change device 31 includes six speed change stages designated A to F.

A display screen displayed using a display screen generator 81 on a display device, such as a liquid crystal panel installed in the traveling work vehicle, performs a critical role in speed change stage selection. The display screen includes a first display screen 101 and a second display screen 200. As shown in FIG. 2, the first display screen 101 is one target notification screen notifying the driver of various information during travel. Arranged in the first display screen 101 are an engine revolutions display area, a stored engine revolutions display area, a drive direction (forward or reverse) display area, and the like, as well as a speed change status display area 102 which is arranged on a lower right side of the first display screen 101 and indicates the currently selected speed change stage of the main speed change device 30 and the currently selected speed change stage of the auxiliary speed change device 31.

The speed change status display area 102 of the first display screen 101 includes an auxiliary speed change stage display area 202 displaying a grouping of speed change stages of the auxiliary speed change device 31; a main speed change stage display area 201 displaying a grouping of speed change stages of the main speed change device 30 assigned to each speed change stage of the auxiliary speed change device 31; and an engaged speed change stage display area 103 displaying the engaged speed change stages, which integrate the speed change stage of the main speed change device 30 currently in use and the speed change stage of the auxiliary speed change device 31 currently in use to determine the vehicle speed change ratio. The second display screen 200 is used as a speed change stage selection screen, and therefore when generated is modeled on the speed change status display area 102 of the first display screen 101. In addition, the second display screen 200 is able to transition from the first display screen 101 through a predetermined operation. The auxiliary speed change stage display area 202 and the main speed change stage display area 201 are arranged on the second display screen 200, as well as, instead of the engaged speed change stage display area 103, a selected speed change stage display area 203 displaying the speed change stage selected in a speed change stage selection task. Moreover, a lower limit selection area 204 and an upper limit selection area 205 are additionally arranged on the second display screen 200. In the lower limit selection area 204, the combined speed change stages of the main speed change device 30 and the auxiliary speed change device 31 that define a lower limit on the vehicle speed change ratio are selected, whereas in the upper limit selection area 205, the combined speed change stages of the main speed change device 30 and the auxiliary speed change device 31 that define an upper limit on the vehicle speed change ratio are selected.

In the example shown in FIG. 2, the auxiliary speed change stage display area 202 and the main speed change stage display area 201 are configured by a semicircular bar graph centered on substantially a middle of the selected speed change stage display area 203. Accordingly, the combined speed change stages of the main speed change device 30 and the auxiliary speed change device 31 can be specified via a line extending in a diameter direction that passes through a center of the semicircle. Moreover, the lower limit selection area 204 and the upper limit selection area 205 are each also configured by a semicircular bar graph centered on the same point. In other words, the auxiliary speed change stage display area 202, the main speed change stage display area 201, the lower limit selection area 204, and the upper limit selection area 205 are arranged so as to be coaxial. The components may be arranged in any diameter direction order; however, in the example shown in FIG. 2, the components are arranged in the order of, outward in the diameter direction, the auxiliary speed change stage display area 202, the main speed change stage display area 201, the lower limit selection area 204, and the upper limit selection area 205.

A lower limit setting indicator 206 indicating the lower limit speed change stage is arranged in the lower limit selection area 204 so as to be capable of moving within the lower limit selection area 204. An upper limit setting indicator 207 indicating the upper limit speed change stage is arranged in the upper limit selection area 205 so as to be capable of moving within the upper limit selection area 205. In the present example, a plus button 206a and a minus button 206b displacing (or used to move or set) the lower limit setting indicator 206 and a plus button 207a and a minus button 207b displacing (or used to move or set) the upper limit setting indicator 207 are provided as software buttons, e.g., touchscreen buttons. Instead of such software buttons, a configuration may also be employed in which the lower limit setting indicator 206 and the upper limit setting indicator 207 are moved directly by dragging, or alternatively hardware buttons may be provided. In any of these cases, the lower limit setting indicator 206 and the combined speed change stage of the main speed change device 30 and the auxiliary speed change device 31 can be positioned on a line extending in the diameter direction through the center of the semicircle and can be displayed on a left side of the selected speed change stage display area 203 as the lower limit speed change stage. In addition, the upper limit setting indicator 207 and the combined speed change stage of the main speed change device 30 and the auxiliary speed change device 31 can be positioned on a line extending in the diameter direction through the center of the semicircle can be displayed on a right side of the selected speed change stage display area 203 as the upper limit speed change stage.

Accordingly, the combined speed change stage of the main speed change device 30 and the auxiliary speed change device 31 achieved by operating the first operation portion MU or the second operation portion SU can be limited to a speed change range selected through the above-described speed change stage selection process.

Figure 3:
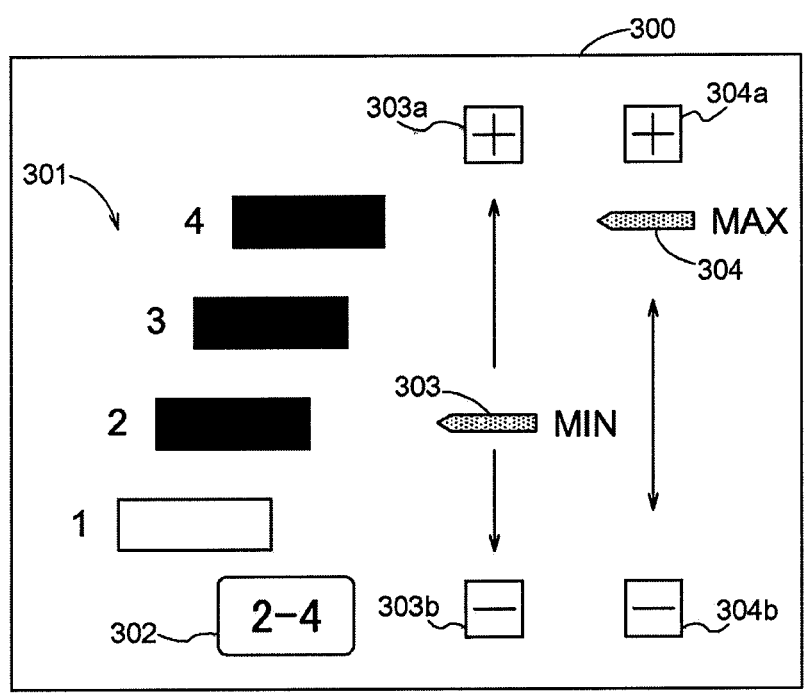
FIG. 3 is a schematic view illustrating an exemplary display screen for the speed change controls according to the present invention.

Moreover, the main speed change device 30 can also be configured to be capable of selecting the engaged speed change stages. The speed change stage selection process of the main speed change device 30 can, for example, be performed via an engaged speed change stage selection screen 300 for the main speed change device 30, as shown in FIG. 3, which is an exemplary third display screen 300. In order to facilitate description, the main speed change device 30 includes four speed change stages numbered 1 to 4 in the present example, as well. Four horizontal bars 301 representing the four speed change stages are arranged on the left side of the engaged speed change stage selection screen 300, and a selected speed change stage and non-selected speed change stages can be differentiated by an image color or image pattern of the horizontal bars 301. A selected speed change stage display field 302 is arranged below the four horizontal bars 301, showing the selected speed change stages as a numerical value (for example, "2-4"). A lower limit setting indicator 303 indicating the lower limit speed change stage and an upper limit setting indicator 304 indicating the upper limit speed change stage are arranged in a line on a right side of the engaged speed change stage selection screen 300. In the present example, a plus button 303a and a minus button 303b displacing (or can be used to move or set) the lower limit setting indicator 303 and a plus button 304a and a minus button 304b displacing (or can be used to move or set) the upper limit setting indicator 304 are provided as software buttons. Instead of such software buttons, a configuration may also be employed in which the lower limit setting indicator 303 and the upper limit setting indicator 304 are moved directly by dragging, or hardware buttons may be provided.

The above-noted selection of the engaged speed change stages can be set independently for the work travel mode and the road travel mode. In a case where a narrow speed change range is used in the work travel mode and a broad speed change range is used in the road travel mode, a configuration is preferred in which selection of the speed change range of the main speed change device 30 using the third display screen 300 is enabled during the work travel mode and selection of the speed change stage of the main speed change device 30 and the auxiliary speed change device 31 using the second display screen 200 is enabled during the road travel mode.

Figure 4:
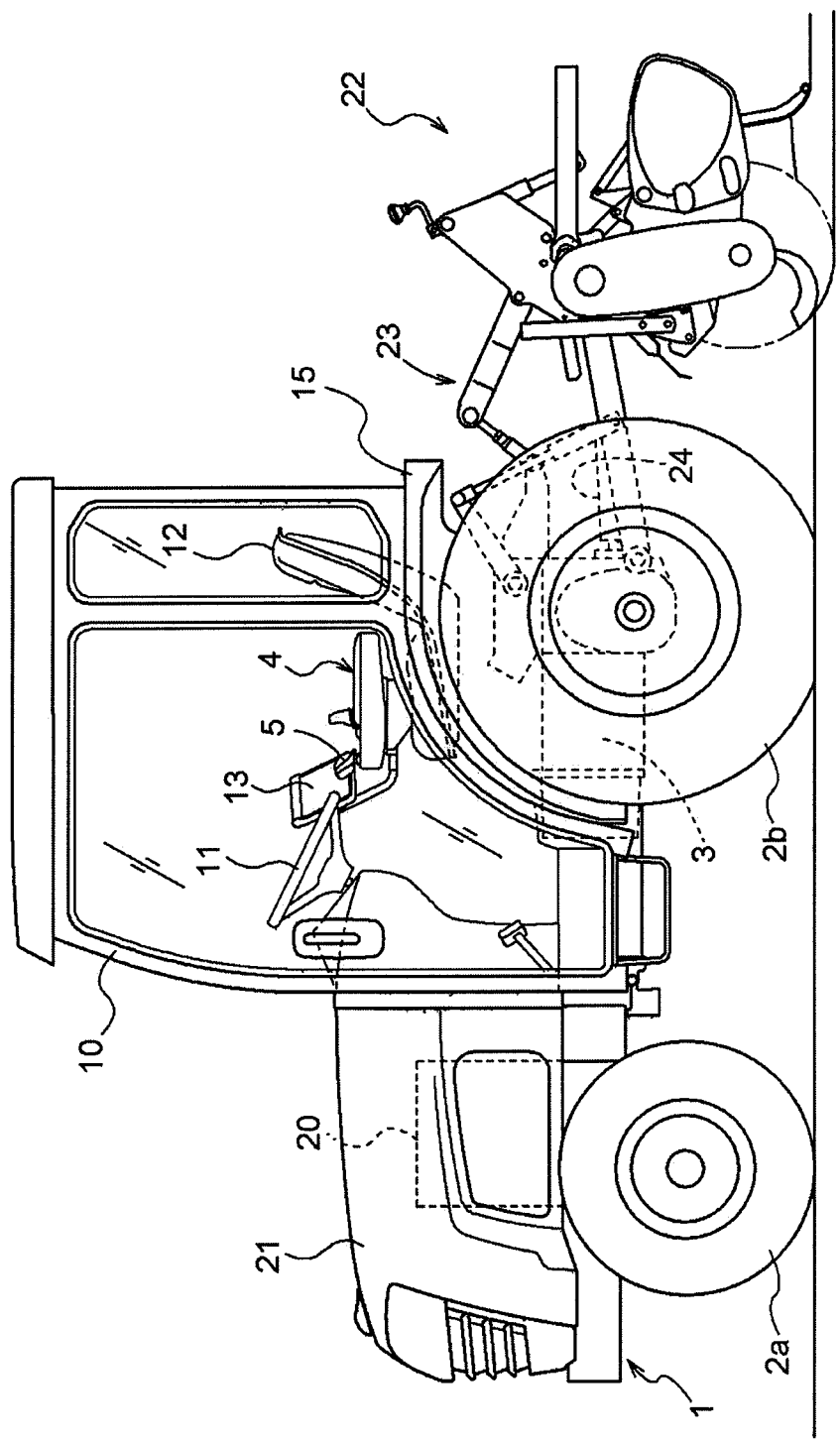
FIG. 4 is a side view of a tractor illustrating an embodiment of a traveling work vehicle which can utilize the system according to the present invention.

Next, a specific embodiment of the traveling work vehicle according to the present invention is described with reference to the drawings. FIG. 4 is a side view of a tractor exemplary of the traveling work vehicle. As illustrated in FIG. 4, in the tractor, an engine 20 is mounted on a front portion of a vehicle body 1 of the tractor and a transmission 3 is mounted rearward of the engine 20, the vehicle body 1 being supported by front wheels 2a and rear wheels 2b. Rearward of the vehicle body 1, a rotary tilling apparatus is provided as an exemplary work apparatus 22 so as to be vertically movable via a link mechanism 23. The tractor is a four-wheel-drive vehicle and drive power of the engine 20 is transmitted, via a speed change mechanism installed in the transmission 3, to the rear wheels 2b and front wheels 2a, which are capable of acting as drive wheels. Moreover, the drive power of the engine 20 is also transmitted to the work apparatus 22 via a PTO shaft 24, which projects rearward from the transmission 3. The engine 20 is covered by a hood 21. A cabin 10 is supported on the vehicle body 1 to the rear of the hood 21 and above the transmission 3.

Figure 5:
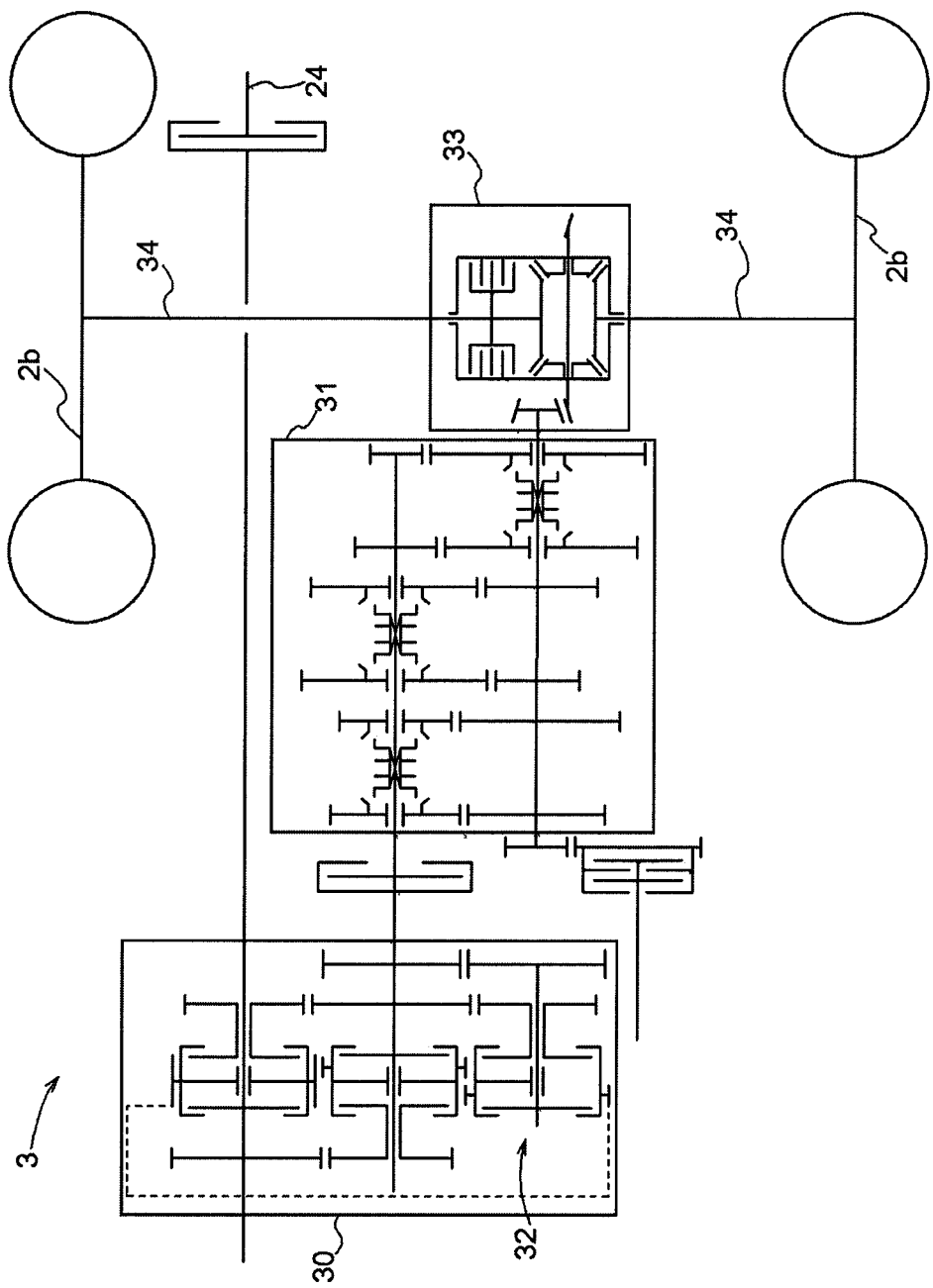
FIG. 5 is a schematic view of a transmission mounted in the tractor.

Although only depicted schematically in FIG. 5, the transmission 3 of the present embodiment includes the main speed change device 30 and the auxiliary speed change device 31 as the speed change mechanism, and the main speed change device 30 further incorporates a forward/reverse travel switching mechanism 32. Speed-changed drive power from the transmission 3 is transmitted to the rear wheels 2b via a differential mechanism 33 and a rear wheel axle 34. Although not depicted in detail, the speed-changed drive power from the transmission 3 can also be transmitted to the front wheels 2a. The main speed change device 30 is of a type that switches between four speed change stages using a constant mesh gear set and a plurality of clutches, without interrupting the transmission of drive power. The auxiliary speed change device 31 is of a type switching between six speed change stages accompanied by an interruption in the transmission of drive power (referred to as a synchromesh type).

Referring back to FIG. 4, an interior of the cabin 10 serves as a driver space, at a front portion of which is arranged a steering wheel or handle 11 steering the front wheels 2a and at a rear portion of which is arranged a driver seat 12, with the driver seat 12 being positioned between a left-right pair of rear wheel fenders 15. An armrest operation device 4, having a multifunction operation tool 5, is provided spanning from a side of the driver seat 12 to a front side thereof. A display 13 which visually notifies the driver of various information is provided on a front side of the armrest operation device 4.

Figure 6:
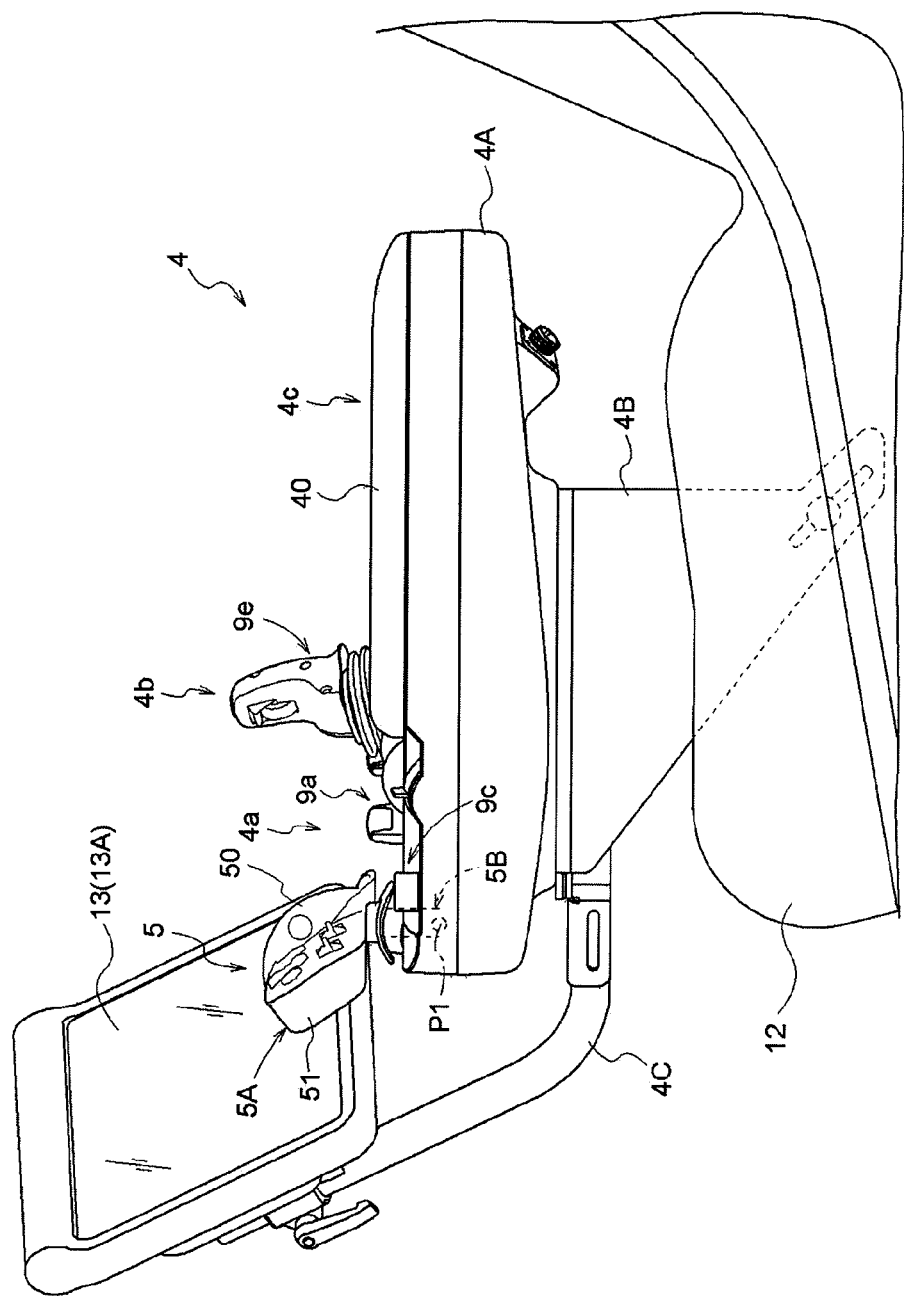
FIG. 6 is a side view of an armrest operation device provided to the tractor.
Figure 7:
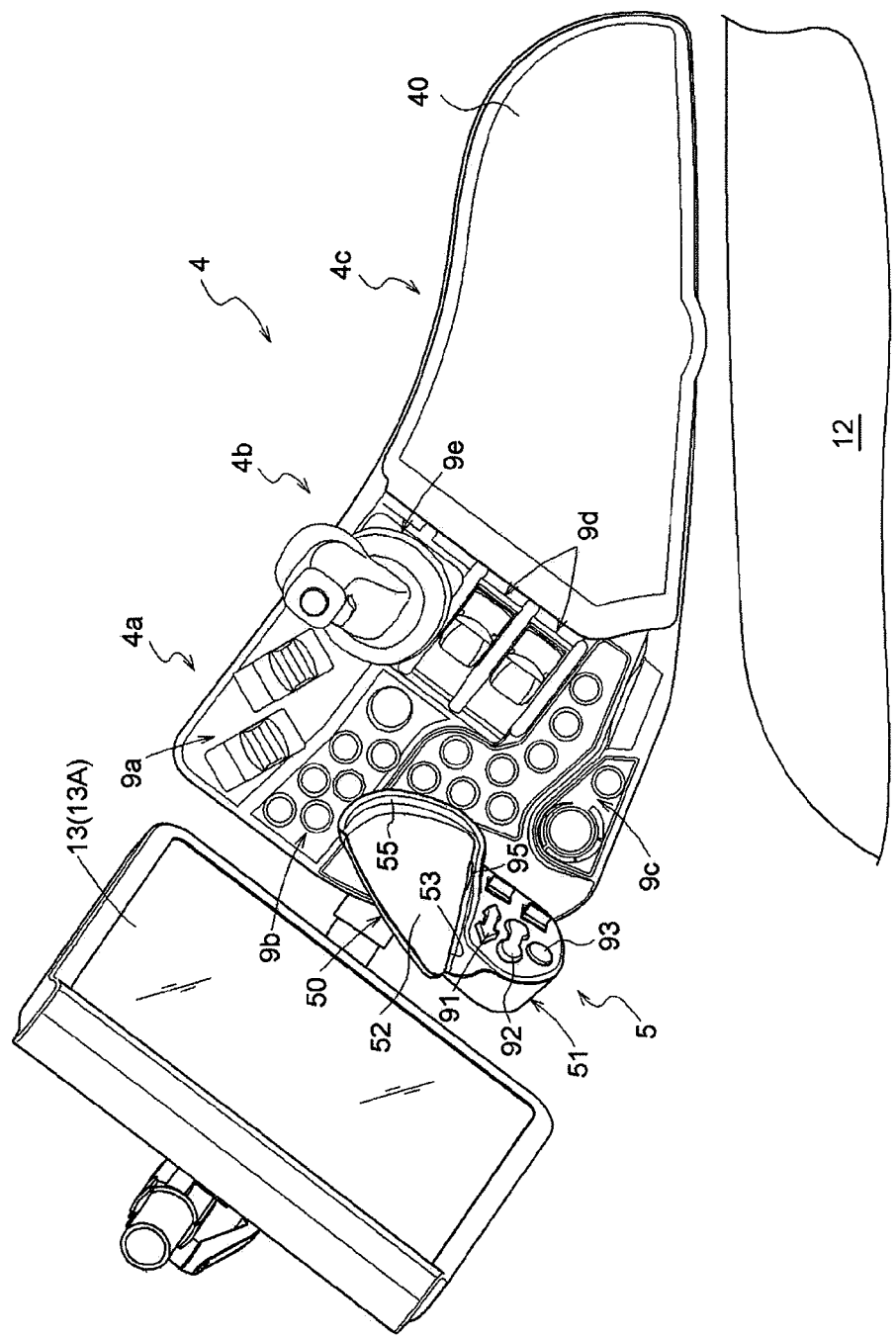
FIG. 7 is a plan view of the armrest operation device.

As shown in FIGS. 6 and 7, the armrest operation device 4 includes an armrest support base 4A which is fixed to a mounting bracket 4B, with the mounting bracket 4B being fixed to a support frame not shown in the drawings. A support rod or member 4C, which inclines upward while extending forward, is fixed to the mounting bracket 4B, and the display 13 (such as a liquid crystal panel and the like) is mounted on a forefront end of the support rod 4C. The display 13 allows an input operation to be performed via a touchscreen panel 13A and can also accept various operation inputs by the driver.

As is apparent from FIG. 6, the armrest operation device 4 can be divided into a front region 4a, a middle region 4b, and a rear region 4c in a plan view. A cushioning armrest bed 40, on which an arm can be rested, is located in the rear region 4c. The multifunction operation tool 5, described in detail hereafter, is provided to substantially a left half of the front region 4a. A first operation switch group 9a and a second operation switch group 9b are provided as operation switch groups 9 to substantially a right half of the front region 4a. From the left, a third operation switch group 9c, a fourth operation switch group 9d, and a fifth operation switch group 9e are arranged as operation switch groups 9 disposed on the middle region 4b. The operation switches provided to each of the operation switch groups 9 may have various forms such as a button, switch, dial, lever, joystick, or the like types.

Figure 8:
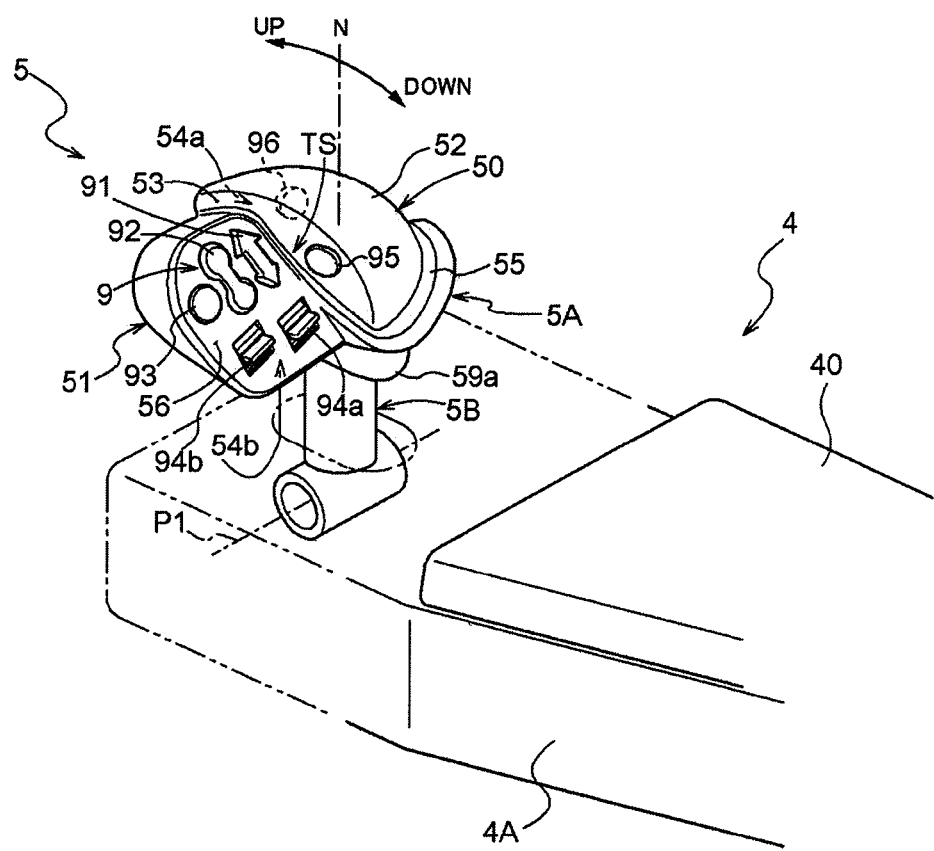
FIG. 8 is a perspective view of a multifunction operation tool provided to the armrest operation device.

The multifunction operation tool 5 is arranged in a front end area on the left side of the armrest base 40 and is supported so as to be capable of pivoting about a pivot axis P1. The multifunction operation tool 5 is used to control a travel status of the tractor and a status of the work apparatus 22 mounted on the tractor. The multifunction operation tool 5 is substantially configured by a grip main body 5A and a pivoting body 5B. As can be seen in FIG. 8, the pivoting body 5B is formed as an arm member that pivots about the pivot axis P1. The vehicle is configured to accelerate by swinging the pivoting body 5B in a forward direction (up) from a pivot-neutral position of the pivoting body 5B, and to decelerate by swinging the pivoting body 5B in a backward direction (down) from the pivot-neutral position.

The grip main body 5A is provided on a free end side of the pivoting body 5B. As illustrated in FIG. 8, the grip body 5A is configured by a grip part 50 that is formed in a right side area, here substantially a right half area, and an extension part 51 (where operation switch groups 9 are arranged) that is formed in a left side area, here substantially a left half area. An outer peripheral surface of the grip body 5A is defined by a convex surface 52, a vertical lateral surface 53, a back surface 54a, and a bottom surface 54b. The convex surface 52 is shaped so that a palm gripping the grip part 50 easily covers the convex surface 52. The vertical lateral surface 53 is a surface which extends substantially perpendicularly with respect to a left edge of the convex surface 52. A tongue piece protruding outward is formed as a hypothenar rest 55 on a bottom edge of the grip part 50, that is, on at least a portion of a boundary area between the bottom surface 54b and the convex surface 52. The hypothenar rest 55 is shaped to hold the hypothenar of a hand resting on the grip part 50 so that the palm does not slip downward.

A top surface of the extension part 51 has a surface that is substantially flat or very slightly convex. Because, in actual application, the top surface of the extension part 51 is arranged so as to face an operator, the top surface of the extension part 51 is hereafter also referred to as an operator-facing surface 56. The operator-facing surface 56 has a shape that extends in a left direction from a bottom edge of the vertical lateral surface 53 of the grip part 50, with the grip part 50 and the extension part 51 connected and the operator-facing surface 56 and the vertical lateral surface 53 intersecting substantially perpendicular to each other. Thus, a space defined by the operator-facing surface 56 and the vertical lateral surface 53 is large enough that the thumb of the hand resting on the grip part 50 can move freely to a certain extent. For this reason, this space is referred to as a thumb space TS.

Operation switches (including buttons, levers, and the like) that belong to the operation switch groups 9 are arranged on the vertical lateral surface 53 and the operator-facing surface 56. In the present embodiment, a shuttle button 91 and a speed change ratio fixing button 93 that belong to a travel-related operation switch group 9, and an up/down button 92 and two hydraulic control switches 94a and 94b that belong to a work-related operation switch group 9, are provided on the operator-facing surface 56. The shuttle button 91 is arranged on substantially an upper half (front half) of the operator-facing surface 56, in a position closest to the vertical lateral surface 53. The up/down button 92 is arranged next to the shuttle button 91 on a left side and the speed change ratio fixing button 93 is arranged further left next to the shuttle button 91. The hydraulic control switches 94a and 94b are arranged side by side on substantially a lower half (front half) of the operator-facing surface 56. In addition, a speed change auxiliary button 95 is arranged on the vertical lateral surface 53. Further, a shuttle auxiliary button 96 is arranged on the back surface 54a of the grip part 50. The shuttle auxiliary button 96 can be easily operated with the index finger or the middle finger of the hand whose palm is resting on the convex surface 52 of the grip part 50.

The shuttle button 91 switches the forward/reverse travel switching mechanism 32 of the transmission 3 to a forward travel state when an upward arrow portion of the shuttle button 91 is pressed along with the shuttle auxiliary button 96, and switches the forward/reverse travel switching mechanism 32 of the transmission 3 to a reverse travel state when a downward arrow portion of the shuttle button 91 is pressed along with the shuttle auxiliary button 96. That is, the forward/reverse travel switching mechanism 32 can be controlled and forward travel and reverse travel of the tractor can be selected by pressing the shuttle button 91 with the thumb while pressing the shuttle auxiliary button 96 with the middle finger or the index finger.

As described above, the main speed change device 30 of the transmission 3 is of a type switching between four speed change stages without interrupting the transmission of drive power, whereas the auxiliary speed change device 31 is of a type switching between six speed change stages accompanied by an interruption in the transmission of drive power (referred to as a synchromesh type). To this end, when switching speed change stages (upshifting/downshifting) via the pivoting operation of the grip part 50 about the pivot axis P1, the operation switching the speed change stage of only the main speed change device 30 (not switching the auxiliary speed change device 31) can be enabled even without pressing the speed change auxiliary button 95. However, the speed change stage switching operation that involves switching the auxiliary speed change device 31 can be disabled when the speed change auxiliary button 95 is not pressed. Specifically, in the present embodiment, in a state where the speed change auxiliary button 95 is not pressed, the multifunction operation tool 5 can act as the first operation portion MU, whereas in a state where the speed change auxiliary button 95 is pressed, the multifunction operation tool 5 can act as the second operation portion SU.

In addition, the transmission 3 is configured such that an appropriate speed change ratio can be set according to a vehicle speed. However, there are cases during performance of work and the like in which it is preferable to maintain the speed change ratio even when the vehicle speed temporarily changes. In order to overcome this issue, the speed change ratio fixing button 93 is configured as a button that forcibly fixates the speed change ratio and, by operating the speed change ratio fixing button 93, the speed change ratio of the transmission 3 does not change even when the vehicle speed decreases due to brake operation and the like.

The up/down button 92 is divided into an upper button or portion and a lower button or portion. Pressing the upper button of the up/down button 92 causes the work apparatus 22 to be lifted and pressing the lower button of the up/down button 92 causes the work apparatus 22 to be lowered. The hydraulic control switches 94a and 94b control valves of hydraulic piping connected to the work apparatus 22.

FIG. 9 illustrates speed change stages before and after an operation toward an acceleration side (upshift) and an operation toward a deceleration side (downshift) are performed using the multifunction operation tool 5. The speed change stages of the main speed change device 30 are indicated by the numbers 1 to 4, and the speed change stages of the auxiliary speed change device 31 are indicated by the letters A to F. The post-speed change operation speed change stages are divided into speed change stages resulting from upshifting or downshifting the grip portion 50 without pressing the speed change auxiliary button 95 (main speed change stage switching operation) and speed change stages resulting from upshifting or downshifting the grip portion 50 while pressing the speed change auxiliary button 95 (auxiliary speed change stage switching operation). The speed change stages after the main speed change stage switching operation are divided by road travel and work travel. The results shown in FIG. 9 correspond to the discussion of FIG. 1, and thus a description thereof is omitted here.

All of the speed change stages 1 to 4 of the main speed change device 30 and all of the speed change stages A to F of the auxiliary speed change device 31 are represented in the summarized speed change stage switching table of FIG. 9. However, as noted with reference to FIG. 2, a usable speed change stage range can be selected from the speed change stages created by the combination of the main speed change device 30 and the auxiliary speed change device 31 in the tractor, as well. Moreover, as noted with reference to FIG. 3, a usable speed change stage range can also be selected from the speed change stages of the main speed change device 30.

Figure 10:
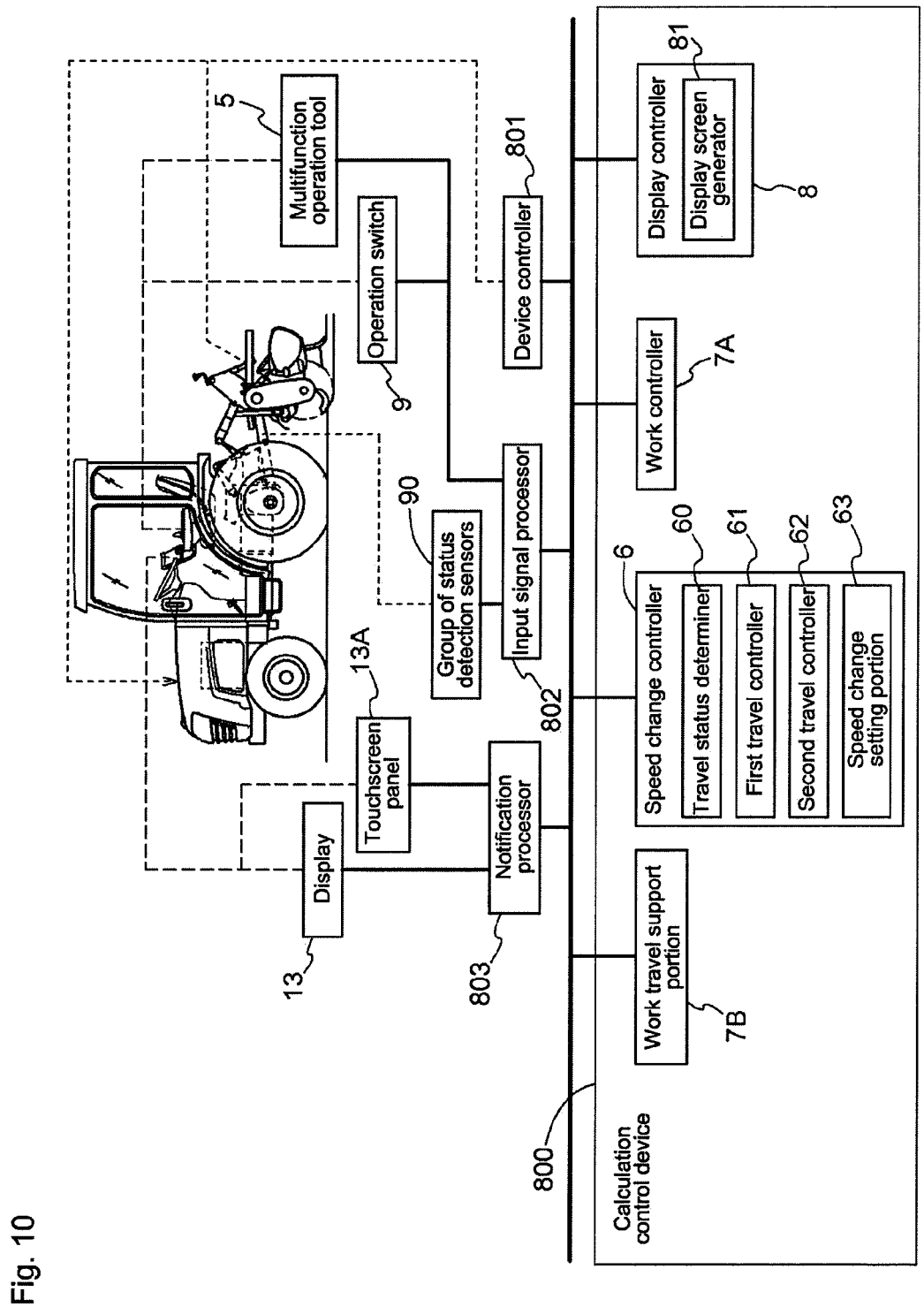
FIG. 10 is a functional block diagram of functions particularly related to the present invention in a control scheme provided to the tractor.

In FIG. 10, a control system equipped on the tractor is illustrated in the form of a functional block diagram. In the control system, functions achieved primarily by a computer program, e.g., installed, stored or running on computer hardware, are represented as a calculation control device 800; however, this distinction is made purely for the purposes of description and the structure of an actual control system can be divided or consolidated as desired. The calculation control device 800 is connected to other portions by an in-vehicle LAN or the like so as to be capable of data transmission. Examples of such portions include a device controller 801, an input signal processor 802, a notification processor 803, and the like. In addition, various functions and portions within the calculation control device 800 are also connected by the in-vehicle LAN or some other data transmission path so as to be capable of data transmission.

The device controller 801 provides operation signals to various operation devices provided to the engine 20, the transmission 3, the work apparatus 22, and the like, controlling the operation thereof. The input signal processor 802 is an input interface, inputting signals from the multifunction operation tool 5, the operation switch groups 9, and the group of status detection sensors 90 that includes various sensors and transferring the input signals to various portions of the control system. The notification processor 803 is an input/output interface, processing image signals output to the display 13, audio signals output to a speaker (not shown), or operation input signals from the touchscreen panel 13A.

The calculation control device 800 shown in FIG. 10 includes a speed change controller 6, a work controller 7A, a work travel support portion or controller 7B, a display controller 8, a travel status determiner 60, and the like.

The speed change controller 6 outputs a speed change control command to the main speed change device 30 and the auxiliary speed change device 31 via the device controller 801, and creates a vehicle speed change ratio with combinations of speed change stages of the main speed change device 30 and the auxiliary speed change device 31. The speed change controller 6 includes a first travel controller 61, a second travel controller 62, and a speed change stage setting portion 63. In the work travel mode, the first travel controller 61 generates the speed change control command to switch between only the speed change stages of the main speed change device 30 in response to a speed change operation command issued due to pivot operation of the multifunction operation tool 5 in a state where the speed change auxiliary button 95 is not pressed. As described above, in the road travel mode, there may be exceptional cases where switching between the speed change stages of the auxiliary speed change device 31 is also involved. The second travel controller 62 generates the speed change control command that involves switching between the speed change stages of the auxiliary speed change device 31 in response to the speed change operation command issued due to pivot operation of the multifunction operation tool 5 in a state where the speed change auxiliary button 95 is pressed. The speed change stage setting portion 63 sets the usable speed change stages of the main speed change device 30 and the auxiliary speed change device 31 via the procedure described with reference to FIGS. 2 and 3.

The display control portion or controller 8, in conjunction with the notification processor 803 and the like, configures a speed change display control device and includes a display screen generator 81 generating the first display screen 101, the second display screen 200, and the third display screen (engaged speed change stage selection screen) 300. A description of the first display screen 101 and the second display screen 200 was previously given with reference to FIG. 2, and a description of the third display screen (engaged speed change stage selection screen) 300 was previously given with reference to FIG. 3. In addition, the speed change range selected via the second display screen 200 and the third display screen 300 is provided to the speed change controller 6 and can be used as a limitation on the speed change stages used in the speed change control.

The travel status determiner 60 determines whether the work vehicle is in the work travel state or the road travel state based on detection signals from at least one status detection sensor from the group of status detection sensors 90, which detect the status of the work vehicle, the detection signals being obtained via the input signal processor 802. When a determination is made that the work vehicle is in the work travel state, the work travel mode is set on the speed change controller 6, and when a determination is made that the work vehicle is in the road travel state, the road travel mode is set.

The work controller 7A performs control of the work apparatus 22 based on signals from the work-related operation switch group 9. The work controller 7A also manages setting the upper limit of the work apparatus 22 and a lifting and lowering speed of the work apparatus 22. The work travel support portion 7B manages warnings and the like, as well as notifications to the driver, based on partial automation of the work travel or on signals from the group of status detection sensors 90.

OTHER EMBODIMENTS (1) In the above-described embodiment, the main speed change stage display area 201 and the auxiliary speed change stage display area 202 were configured by semicircular bar graphs centered on the same point. However, each auxiliary speed change stage and all of the main speed change stages may also be assigned to one side of a halved polygonal bar graph.

(2) The display 13 may be arranged at a location other than the armrest operation device 4. In addition, a plurality of the displays 13 may be included or utilized, which may be configured so as to mirror each other.

(3) The functional blocks in FIG. 10 are merely for illustration purposes. The respective functional components can be consolidated or divided as desired. In particular, the various functions configuring the calculation control device 800 are linked to each other by software, and therefore in many practical cases there is overlap in these portions or functions. The functions shown in FIG. 10 are shown only schematically, and the distinctions are not limited thereby.

In addition to a tractor, the traveling work vehicle according to the present invention may also be applied to an agricultural work vehicle such as a rice transplanter or combine, or to a construction and engineering vehicle such as a front loader.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A speed change display control device for a traveling work vehicle comprising:
   a main speed change device switching between speed change stages without interrupting transmission of drive power;
   an auxiliary speed change device switching between speed change stages accompanied by an interruption in the transmission of drive power;
   a speed change controller outputting a speed change control command to the main speed change device and the auxiliary speed change device and creating a vehicle speed change ratio with combinations of main speed change stages of the main speed change device and auxiliary speed change stages of the auxiliary speed change device; and
   the speed change controller comprising a display screen generator generating at least a first display screen and a second display screen,
   wherein the first display screen comprises:
      an auxiliary speed change stage display area displaying a grouping of the auxiliary speed change stages;
      a main speed change stage display area displaying a grouping of the main speed change stages assigned to the auxiliary speed change stages; and
      an engaged speed change stage display area displaying engaged speed change stages, and
   wherein the second display screen comprises:
      the auxiliary speed change stage display area;
      the main speed change stage display area;
      a lower limit selection area where the speed change stage defining a lower limit of the vehicle speed change ratio is selected;
      an upper limit selection area where the speed change stage defining an upper limit of the vehicle speed change ratio is selected; and
      a selected speed change stage display area displaying the currently selected upper limit and lower limit speed change stages.

2. The speed change display control device according to claim 1, wherein the engaged speed change stage display area displays engaged speed change stages which are obtained through a combination of the main speed change stage currently in use and the auxiliary speed change stage currently in use.

3. The speed change display control device according to claim 1, wherein the auxiliary speed change stage display area and the main speed change stage display area each have a curved or semicircular bar graph shape.

4. The speed change display control device according to claim 3, wherein the lower limit selection area and the upper limit selection area each have a curved or semicircular bar graph shape coaxial with the curved or semicircular bar graph shape.

5. The speed change display control device according to claim 4, wherein at least one of:
   the main speed change stage display area is positioned on a diameter-direction exterior of the auxiliary speed change stage display area; and
   the upper limit selection area is positioned on a diameter-direction exterior of the lower limit selection area.

6. The speed change display control device according to claim 1, wherein a lower limit setting indicator indicating the lower limit speed change stage is arranged in the lower limit selection area, and an upper limit setting indicator indicating the upper limit speed change stage is arranged in the upper limit selection area.

7. The speed change display control device according to claim 6, wherein the lower limit setting indicator and the upper limit setting indicator are at least one of:
   movable to different positions;
   displayable in different positions; and
   settable in different positions.

8. The speed change display control device according to claim 1, wherein the engaged speed change stage display area and the selected speed change stage display area are displayed together or share a display area.

9. The speed change display control device according to claim 1, wherein the display screen generator generates a third display screen different from the first and second display screens.

10. The speed change display control device according to claim 9, wherein the third display screen is at least one of:
an engaged speed change stage selection screen; and
a screen allowing selection from a grouping of main speed change stages.

11. A speed change display control device for a traveling work vehicle comprising:
a main speed change device switching between speed change stages without interrupting transmission of drive power;
an auxiliary speed change device switching between speed change stages during an interruption in the transmission of drive power;
a speed change controller outputting a speed change control command to the main speed change device and the auxiliary speed change device and creating a vehicle speed change ratio with at least one combination of main speed change stage of the main speed change device and auxiliary speed change stage of the auxiliary speed change device; and
a display screen displaying at least a first display screen and a second display screen,
wherein the first display screen comprises:
an auxiliary speed change stage display area displaying indicia indicative of plural auxiliary speed change stages;
a main speed change stage display area displaying indicia indicative of plural main speed change stages; and
an engaged speed change stage display area displaying indicia indicative of engaged speed change stages, and
wherein the second display screen is different from the first display screen and comprises at least:
a lower limit selection display area displaying indicia indicative of a lower limit of the vehicle speed change ratio;
an upper limit selection display area displaying indicia indicative of an upper limit of the vehicle speed change ratio; and
a selected speed change stage display area displaying indicia indicative of:
a currently selected upper limit value or indicator; and
a currently selected lower limit value or indicator.

12. The speed change display control device according to claim 11, wherein the second display screen comprises at least one of:
the auxiliary speed change stage display area; and
the main speed change stage display area.

13. The speed change display control device according to claim 11, further comprising a third display screen different from the first and second display screens and displaying a lower limit setting indicator and an upper limit setting indicator.

14. A speed change display control device for a traveling work vehicle comprising:
a main speed change device switching between speed change stages without interrupting transmission of drive power;
an auxiliary speed change device switching between speed change stages during an interruption in the transmission of drive power;
a speed change controller outputting a speed change control command to the main speed change device and the auxiliary speed change device and creating a vehicle speed change ratio with at least one combination of main speed change stage of the main speed change device and auxiliary speed change stage of the auxiliary speed change device; and
a display screen displaying at least a first display screen and a second display screen,
wherein the first display screen displays:
indicia indicative of plural auxiliary speed change stages;
indicia indicative of plural main speed change stages; and
indicia indicative of engaged speed change stages, and
wherein the second display screen displays:
indicia indicative of plural auxiliary speed change stages;
indicia indicative of plural main speed change stages;
indicia indicative of a lower limit of the vehicle speed change ratio; and
indicia indicative of an upper limit of the vehicle speed change ratio.

15. The speed change display control device according to claim 14, further comprising a third display screen displaying:
one or more selected speed change stages;
one or more non-selected speed change stages;
a lower limit setting indicator;
an upper limit setting indicator; and
buttons for moving the lower limit setting indicator and the upper limit setting indicator.

* * * * *